(12) United States Patent
Li et al.

(10) Patent No.: US 8,910,117 B2
(45) Date of Patent: Dec. 9, 2014

(54) CUSTOMIZING AND PERFORMING POLICY IN VERSION CONTROL

(75) Inventors: Xian Li, Shanghai (CN); Ling Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 1733 days.

(21) Appl. No.: 11/854,812

(22) Filed: Sep. 13, 2007

(65) Prior Publication Data

US 2008/0072217 A1 Mar. 20, 2008

(30) Foreign Application Priority Data

Sep. 14, 2006 (CN) .......................... 2006 1 0153879

(51) Int. Cl.
*G06F 9/44* (2006.01)
(52) U.S. Cl.
CPC ....................................... *G06F 8/71* (2013.01)
USPC ............................ 717/120; 717/122; 717/170
(58) Field of Classification Search
None
See application file for complete search history.

(56) References Cited

U.S. PATENT DOCUMENTS

| | | | |
|---|---|---|---|
| 6,631,386 B1 | 10/2003 | Arun et al. | |
| 6,928,637 B2 | 8/2005 | Leherbauer | |
| 6,993,759 B2 * | 1/2006 | Aptus et al. | 717/170 |
| 2001/0025311 A1 * | 9/2001 | Arai et al. | 709/225 |
| 2002/0162077 A1 | 10/2002 | Jeng et al. | |
| 2003/0200235 A1 | 10/2003 | Choy et al. | |
| 2003/0233621 A1 | 12/2003 | Paolini et al. | |
| 2004/0073581 A1 | 4/2004 | McVoy et al. | |
| 2005/0044531 A1 | 2/2005 | Chawla et al. | |
| 2005/0114692 A1 | 5/2005 | Watson-Luke et al. | |
| 2006/0015850 A1 | 1/2006 | Poole | |
| 2006/0026567 A1 | 2/2006 | McVoy et al. | |

OTHER PUBLICATIONS

Yang Yang, et al., Object-Based Access Control Model, Journal: Automation of Electric Power Systems, Apr. 10, 2003, pp. 6-10, vol. 27, No. 7, China National Knowledge Infrastructure, Published on the World Wide Web at: http://en.cnki.conn.cn/Article_en/CJFDTOTAL-DLXT200307009.htm, (English abstract at end of article).

* cited by examiner

*Primary Examiner* — Qamrun Nahar
(74) *Attorney, Agent, or Firm* — Lee Law, PLLC; Christopher B. Lee

(57) ABSTRACT

A method of setting customized policy for version control, a version control method, apparatus for setting customized policy for version control, apparatus for performing version control customized policy, and a version control system. There is provided a method of setting customized policy for version control by generating at least one version control customized policy by selecting or setting a version control option; associating the version control customized policy generated with one project or user; and saving the version control customized policy and information of its associated project or user.

20 Claims, 4 Drawing Sheets

CUSTOMIZING AND PERFORMING POLICY IN VERSION CONTROL

FIELD OF THE INVENTION

The present invention relates to version control technology, more particularly to the technology of setting customized policy for version control.

BACKGROUND

Traditionally we use IDE (Integrated Development Environment) to modify a source file's content, VCS (Version Control System) to do the version control of source file's version. In most situations, VCS does not insert additional information into the source file's content, but adds some metadata of that file in the VCS to track the version change. That means version control information cannot be seen by developers directly. Once the source file is retrieved out of the VCS, users cannot directly see source file's version control and the additional information that helps to recognize the modification state.

Most popular VCS products, for example CVS (Concurrent Versions System), ClearCase, and CMVC (Configuration Management Version Control), provide strong version control functions for users, such as performing actions like add into source control, check-in, check-out, and the like, on the source file.

CVS is used to record all source codes' modification history. The basic idea for CVS is to build a file repository on a server, where many different projects' source programs can be stored in the file repository, and the storage and configuration of the file repository is uniformly managed by an administrator. When using version control tools, each user can add a new file into the file repository or download an existing project file in the file repository to local. Any change made by the user is first performed at local, and then submitted with a CVS command, and the CVS system tracks the change of the file and detects modification collisions.

ClearCase is an SCM (Software Configuration Management) tool, and provides the necessary automated means and flow support used to realize SCM best practice. ClearCase provides an open framework to realize various different types of SCM solutions.

CMVC is based on a project database. It separates the storage of all software development project's description and source file meta-information (i.e. metadata, such as file update record, etc.) from the source file itself, and saves them in a separate database.

However, these version control systems can only provide a unified method and action to handle all situations, and users cannot do customization during development of different source files and projects.

SUMMARY

The present invention provides a method of setting customized policy for version control, a version control method, an apparatus for setting customized policy for version control, an apparatus for performing version control customized policy, and a version control system.

According to one aspect of the invention, there is provided a method of setting customized policy for version control, comprising the steps of: generating at least one version control customized policy by selecting or setting a version control option; associating the version control customized policy generated with one project or user; and saving said version control customized policy and information of its associated project or user.

According to another aspect of the invention, there is provided a version control method, comprising the steps of: receiving a version control command; obtaining at least one version control customized policy associated with said version control command, wherein each of said version control customized policy contains a pre-selected or pre-set version control option; obtaining information of an associated project or user; and performing said version control command customly according to said obtained at least one version control customized policy and information of said associated project or user.

According to another aspect of the invention, there is provided an apparatus of setting customized policy for version control, comprising: a policy generating unit configured to generate at least one version control customized policy by selecting or setting a version control option; a policy customizing unit configured to associate the version control customized policy generated by said policy generating unit with one project or user; and a saving unit configured to save said version control customized policy and information of said associated project or user.

According to another aspect of the invention, there is provided an apparatus for performing version control customized policy, comprising: a command receiving unit configured to receive a version control command; a policy obtaining unit configured to obtain at least one version control customized policy associated with said version control command, wherein each of said version control customized policy contains a pre-selected or pre-set version control option; an associated information obtaining unit configured to obtain information of an associated project or user; and a command performing unit configured to perform said version control command customly according to said at least one version control customized policy obtained by said policy obtaining unit and information of said associated project or user obtained by said associated information obtaining unit.

According to another aspect of the invention, there is provided a version control system, comprising: the above-mentioned apparatus of setting customized policy for version control configured to set a version control customized policy; a version control repository; and the above-mentioned apparatus for performing version control customized policy configured to perform said version control customized policy with said version control repository.

BRIEF DESCRIPTION OF THE DRAWINGS

It is believed that the invention will be better understood from the description of the detailed implementation of the invention in conjunction with accompany drawings, in which.

DETAILED DESCRIPTION

Figure 1:
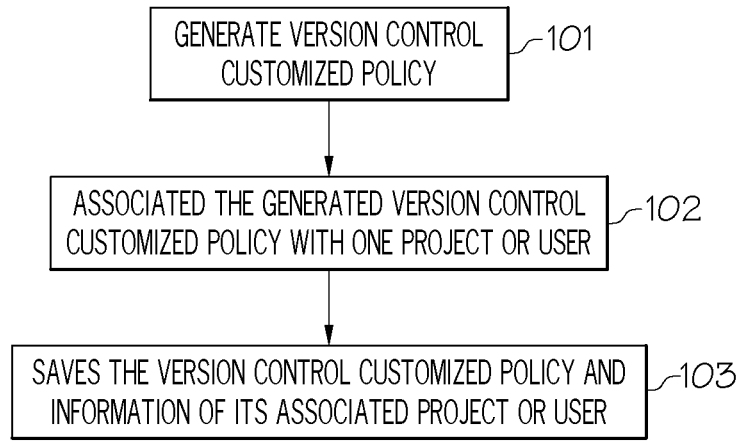
FIG. 1 is a flowchart of a method of setting customized policy for version control according to one embodiment of the invention.

FIG. 1 is a flowchart of a method of setting customized policy for version control according to one embodiment of the invention. As shown in FIG. 1, first at step 101, one or more version control customized policies are generated by selecting or setting a version control option.

In particular, a version control repository is a central storage place in a version control system and is used to store controlled files on a shared server. The version control repository not only stores files themselves, but also version information and file changes of each controlled file. User can retrieve (checkout) a file with specific version from the version control repository and write it back (check-in) to the version control repository while automatic setting the version of the written file by the version control system. Physically, the version control repository uses a file system of the operating system for file control and version management. A version control repository will be described in detail below.

In the present embodiment, the version control option is used to perform various customized operation on the controlled file and actually, it can be considered as a kind of policy atom. These policy atoms include, but are not limited to:

Code Formatting option: While a source file is checked in, the "Code Formatting" option will format the code style according to predefined style template to let the source file more easily to read and understand.

Document Summary Generating option: To view document summary information, typically the user will check out the entire file. The "Document Summary Generating" option can scan the document and create a short summary based on document structure and content to assist the user to view document summary information. This will both save network transfer volume and also deliver only the summary information to users.

Copyright information validation option: When a new source file is added, "Copyright information validation" option will scan the source code to find if it contains third-party code by checking file header and comment parts to make sure no copyright violation code will be checked into the version control repository.

Metadata Replacement option: To edit a document, it is often necessary to replace the document properties, like author of a Word document, organization, business unit etc., with current user information. The "Metadata Replacement" option will automatically replace the old metadata with new ones either at check-in or check-out phase.

Public API Protection option: For a public API (application programming interface), it is not allowed to rename, modify or delete the interface definition of a published public API. The "Public API Protection" option will block any request to change interface code made to a public API, making a public API compatible from versions to versions.

Adding Header to New Added Source File option: While adding new source files into a version control system, the "Adding header (such as corporate information, project information etc.) to new added source file" option will enable automatically adding predefined header information into the source files.

Smart Merging option: While a single source file is concurrently modified by several developers, the "Smart merging" option will judge whether there's a potential conflict after a simple content scan. If there's no potential conflict, the merge operation will be done automatically without human interaction.

Information Update Tagging option: The "Information Update Tagging" option will add a comment information line in front of source file's updated part.

Exporting for Different Platform option: The "Export for different platform" option will convert the source files' format to specified platform's format when they are retrieved based on different platforms.

Setting Version for Specific User option: If the username of the checked-in file is "Jack", then the "Setting Version for Specific User" option will set the file's version to, for example, version 1.5.

Confliction Notifying option: If there is a conflict when checking in a file and the time is weekend, then the "Confliction Notifying" option will send an email to the administrator.

It should be understood that the above listed version control options are merely for illustration and the invention is not so limited.

The collection of these policy atoms forms a policy offering package, and generally, a user selects one or more policy atoms from the policy offering package, and enters customized information to fill in the policy atoms. Each policy atom needs one software code module to execute that policy atom, all code that support the policy atom will be executed in a policy layer.

In the above step 101, one or more version control customized policies are generated by selecting, setting or combining the above version control options. Specifically, a version control customized policy is an executable entity that provides an input template for user's preference, receives several files as input source, and generates output files according to user's input preference. For example, the policy "Adding Header to New Added Source File" will add comment information to each new source file. Then, the policy layer receives one or more files as input source. That means the policy layer can work on both single file input and multiple files input. Next, the policy layer generates output files according to user's input preference, which is a one by one process. The number of output files is equal to that of input files. Each policy atom has a type attribute (such as "add into source control", "check-in", "check-out" and "export") to indicate which type of interaction type the policy atom belongs to.

The example of the version control customized policy generated in step 101 includes, but not limited to: Code Formatting policy, Document Summary Generating policy, Copyright information validation policy, Metadata Replacement policy, Public API Protection policy, Adding Header to New Added Source File policy, Smart Merging policy, Information Update Tagging policy, Exporting for Different Platform policy, Setting Version for Specific User policy, Confliction Notifying policy and combination thereof. It should be understood that the example of the version control customized policy generated is not limited to this, it can be a combination of the foregoing version control options, or it can comprise any existing and future developed version control customized policies known to those skilled in the art.

Next, at step 102, the version control customized policy generated is associated with one project or user. Specifically, the project manager generates new version control customized policies in step 101 as the project mandatory policies for that project according to that project's preference; or the project manager selects some from the version control customized policies generated as the project mandatory policies for that project. The term "project mandatory policy" refers to that the policy is associated with any user related to that project, that is, when a user related to that project performs actions on a source file, the project mandatory policy will be performed at the same time. Furthermore, different project managers can select respective project mandatory policies according to each project's preference. A project's mandatory policies form a policy set of that project.

Figure 4:
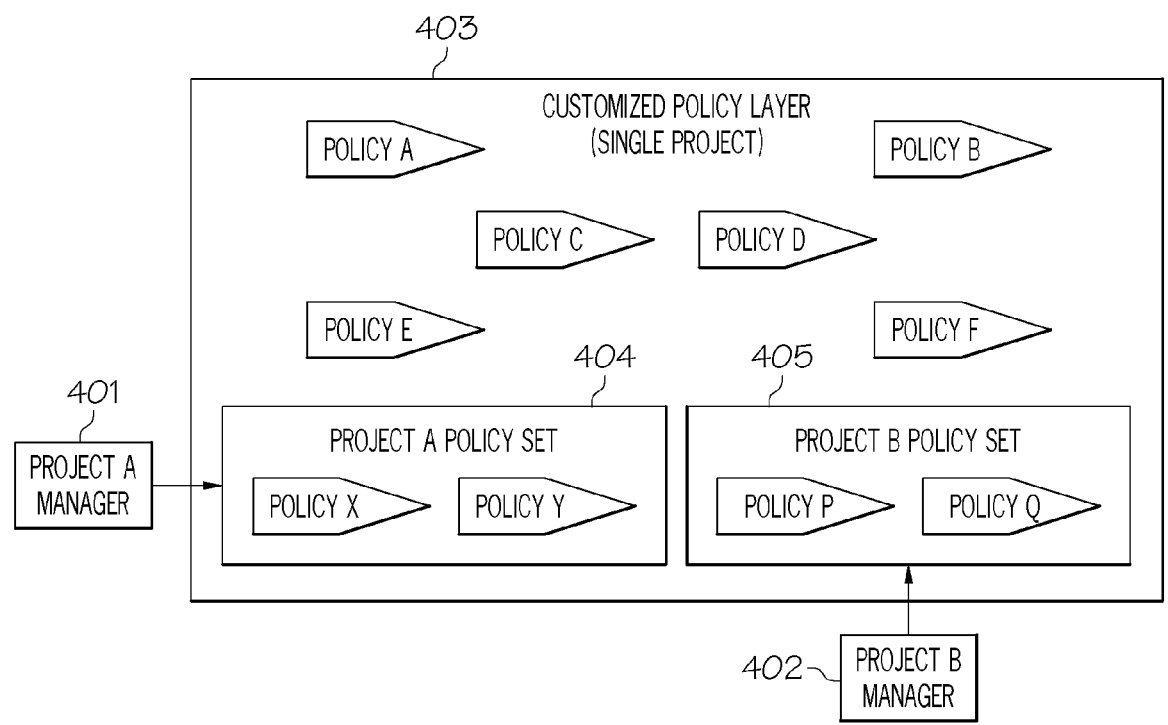
FIG. 4 is a diagram of project manager selecting and defining project mandatory policies when initializing a customizable policy layer according to the embodiment of the invention.

A policy set is one or more policies for a specific project use, as shown in FIG. 4, which shows a project manager 401, 402 selecting and defining project mandatory policies when initializing a customizable policy layer 403 according to an embodiment of the invention.

In FIG. 4, Project A manager 401 customizes a Project A policy set 404 for Project A, the policy set comprises Policy X, Policy Y, etc. Project B manager 402 customizes a Project B policy set 405 for Project B, the policy set comprises Policy P, Policy Q, etc.

In addition, a user can select or customize his associated version control customized policy from the version control customized policies generated in step 101 based on his or her preference, as that user's user customized policy. The term "user customized policy" refers to that when the user performs action on a source file, the user customized policy will be performed at the same time. The user customized policy can include one or more forgoing version control customized policies, and the invention has no limitation to this.

Finally, at step 103, said version control customized policy and information of its associated project or user are saved. Specifically, the version control customized policies generated in step 101 and the information of the project or user associated with the version control customized policies obtained in step 102 are saved in the customizable policy layer 403 of the version control system. The customizable policy layer locates between the user and version control repository. The customizable policy layer contains all policies (such as customizable add to source control policy, customizable check-in/out policy, customizable export policy, etc.) and policy set, and information of the project or user associated with that policy or policy set. Each policy set is associated with one project. The policy list selected by each user is passed into the customizable policy layer as input source for the selected policy, and the selected policy is executed in a customizable policy layer executing module. Additionally, customized version control policies can be generated first, and then the generated customized version control policies are stored. In a project application, project manager selects one or more policies from the generated version control customized policies, associates them with a project and then stores the association relationship, which is also a particular implementation of steps 101, 102, 103.

From the above description it can be seen that the method of setting customized policy for version control of the embodiment can customize different policies for different projects or users in a version control system, and do corresponding customization during development of different source files and projects, thereby significantly improves the flexibility of the version control system.

Figure 2:
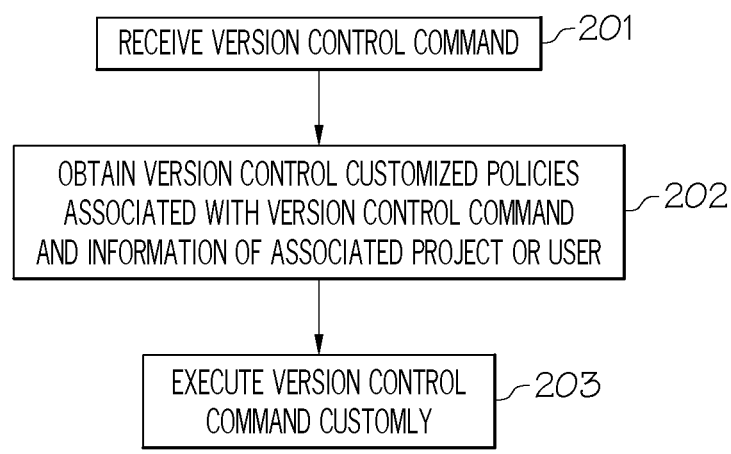
FIG. 2 is a flowchart of a version control method according to another embodiment of the invention.

Under the same inventive conception, FIG. 2 is a flowchart of a version control method according to another embodiment of the invention. Next, the embodiment will be described in conjunction with FIG. 2. For those same part as the above embodiment, the description of which will be properly omitted.

In FIG. 2, first at step 201, a version control command is received. In general, the version control command contains a command of adding a file, updating a file in the version control system or retrieving a file from the version control system issued by a user in the version control system, or other related commands issued by the system. In particular, the command contains a command of add to source control, check-in, check-out, export and any other commands that is known to those skilled in the art, the invention has no limitation to this.

Next, at step 202, one or more version control customized policies associated with said version control command are obtained, wherein each of said version control customized policies contains a pre-selected or pre-set version control option, and information of a project or user associated with said version control customized policies. It is also possible that the version control customized policies do not have any information of associated project or user, instead, the received version control command contains information of associated project or user, and in this case, the information is associated with the version control customized policies. These version control customized policies and information of the project or user associated with each version control customized policy can be saved in a customizable policy layer of the version control system. Here, obtaining version control customized policies associated with said version control command can be implemented in various ways, such as the version control customized policy is customized when executing the version control command; one or more stored version control customized policies can be associated with the version control command in advance, and the version control customized policy is retrieved when executing the version control command; or the version control customized policy can be customized first, but it is not associated with the version control command, and association is performed when executing the version control command, etc.

The example of optional version control customized policy includes, but not limited to: Code Formatting policy, Document Summary Generating policy, Copyright information validation policy, Metadata Replacement policy, Public API Protection policy, Adding Header to New Added Source File policy, Smart Merging policy, Information Update Tagging policy, Exporting for Different Platform policy, Setting Version for Specific User policy, Confliction Notifying policy, etc. It should be appreciated that the example of optional version control customized policy is not limited to this, it can be a combination of the foregoing version control customized policies, or it can comprise any existing and future developed version control customized policies known to those skilled in the art.

Finally, at step 203, the version control command is customly performed according to said selected version control customized policies.

Figure 3:
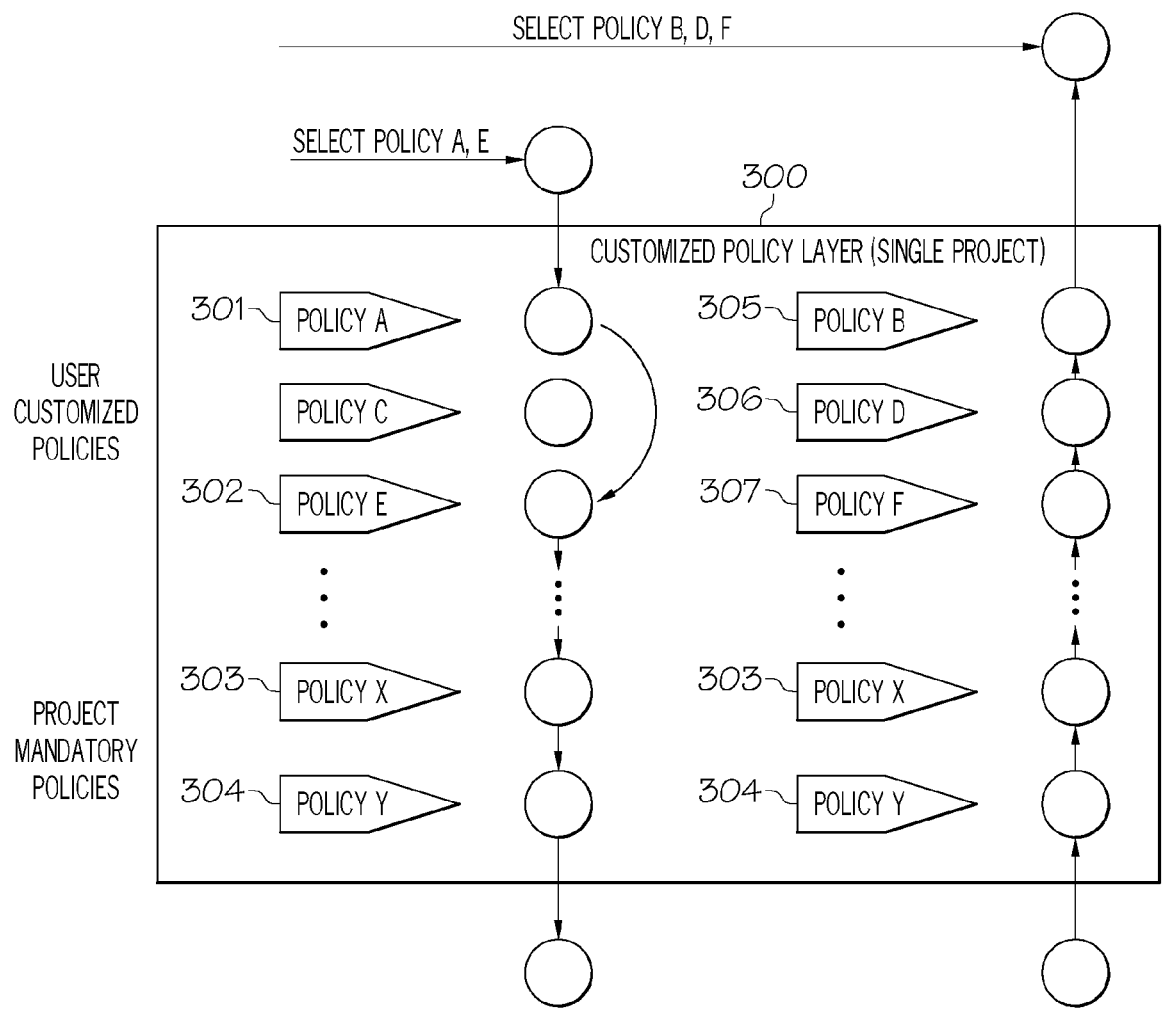
FIG. 3 is a diagram of user command performing relevant actions with customized policies and project mandatory policies according to the embodiment of the invention.

FIG. 3 is a diagram of user command performing relevant actions with customized policies and project mandatory policies according to an embodiment of the invention. The command shown in the left of FIG. 3 is, for example, add/update file command. That command has user selected customized Policy A 301 and Policy E 302, and project mandatory policies of the project associated with that command, Policy X 303 and Policy Y 304. The step of performing the version control command customly comprises: first, a file related to the command is sent to the customizable policy layer 300; next, actions of Policy A 310, Policy E 302, Policy X 303, and Policy Y 304 are performed on the related file in the customizable policy layer 300, and then the generated file is sent to the version control repository for saving.

The command shown in the right of FIG. 3 is, for example, retrieve file command. That command has user selected customized Policy B 305, Policy D 306, and Policy F 307, and project mandatory policies of the project associated with that command, Policy X 303 and Policy Y 304. The step of performing the version control command customly comprises: first, a file related to the command is retrieved from the version control repository and is sent to the customizable policy layer 300; next, actions of Policy B 305, Policy D 306, Policy F 307, Policy X 303, and Policy Y 304 are performed on the related file in the customizable policy layer, and then the generated file is sent to user.

The process of policy setting and policy implementing in version control of the invention is described in the following through a preferred embodiment of the invention.

Phase I: customize project mandatory policy. When a project goes into coding phase, project manager creates a VOB (Versioned Object Base) for that project, and selects several customized policies as that project's policy set, i.e. project mandatory policies. An example of User Interface (UI) is shown in the following Table 1.

TABLE 1

| Policy name | Type |
| --- | --- |
| ☑ File header convention policy | Add into source control |
| ☑ Smart merge policy | Check-in |
| ☐ Update information convention policy | Check-in |
| ☐ Export for different platform policy | Export |
| . . . | |

For example, the manager of project "P" defines the following project mandatory policies for that project:

(a) Adding Header to New Added Source File Policy

The adding header to new added source file policy performing module automatically adds customized header information into the head of the source file's content. Its type indicates it's executed during the adding into source control interaction. The project manager defines the content information as following:

```
/*
 * Name: <file name>
 * Author: <user name>
 * Creation date: <time stamp>
 * Copyright (c) 2006, International Business Machines Corporation
 * All right reserved.
 */
```

(b) Smart Merging Policy

The smart merging policy performing module does a smart automatic source file content merge when one file is modified by multiple developers at the same time in a parallel development. Its type indicates it's executed during the checking in interaction. Once a conflict occurs during a merge, the conflict sections are judged by a simple meaning analysis scan within the file. If it is found that modification to source code does not influence the logic of program itself, for example, blank line, blank character or comment information are added, then the conflict sections can be overlapped directly; if the modification to source code has influenced the logic of the program itself, then user can be notified in a default manner and it is left for user to finally decide whether to override.

(c) Code Formatting Policy

The code formatting policy performing module in policy layer will format the code style according to predefined style template to let the source more easily to read and understand. Its type indicates it's executed during the adding into source control and checking in interaction.

(d) Copyright Information Validation Policy

The copyright information validation policy performing module in policy layer will scan the source code (for example, "GPL", "CPL" license identifier) to find if it contains third-party code by checking file header and comment parts to make sure no copyright violation code will be checked in to the version control repository. If violation is found, the operation would be blocked. Its type indicates it's executed during the adding into source control and checking in interaction.

(e) Public API Protection Policy

The public API protection policy performing module in policy layer will not allow make any interface changes (for example, rename, change or eliminate) to these public APIs. If violation is found, the operation would be blocked. Its type indicates it's executed during the checking in interaction.

Phase II: add new source file. Developers start to add new source files into source control of customizable version control system. A developer with id "Sam" adds a source file "Hello.java" of project "P" into source control at "2006-04-28" without choosing any policies. The source file is passed to the customizable policy layer and the customizable policy layer finds out the policy set of the project "P". Then the source file is executed with those policies in the policy set with the right type. In this case the source file is modified by the "Adding header to new added source file policy" and the "Code formatting policy".

The original source file:

```
package com.ibm.abc;
public class Hello { int x=0; public void printHello( ) {
System.our.println(
"Hello world");} public void
printBye( )
{System.out
.println("Bye");}}
```

The modified source file:

```
/*
 * Name: Hello.java
 * Author: Sam
 * Creation date: 2006-04-28
 * Copyright (c) 2006, International Business Machines Corporation
 * All right reserved.
 */
package com.ibm.abc;
public class Hello {
   int x = 0;
   public void printHello( ) {
      System.out.println("Hello world");
   }
   public void printBye( ) {
      System.out.println("Bye");
   }
}
```

At the same time, a developer with id "Ling" wants to add a source file from third party into source control. For example, he added the following source file into source control without selecting any policies:

```
...
// GPL License agreement, 2006
...
```

At this point, the policy performing modules in the policy set will be taken action. In this case, the "Copyright information validation policy" determines the "GPL" signature means there might be some content developed by third-party. So this adding to source file operation will fail and "Ling" will get an error message accordingly.

Phase III: develop in parallel. Developers update the source files paralleled. Usually multiple developers are allowed to work on the same source files paralleled. For example, two developers with id "Sam" and "Ling" update the same source file "Hello.java" of project "P" concurrently. They both checked out the file and Ling checks in the file first with the "Information update tagging policy" selected. That means the source file's content will be evaluated and an information line will be inserted into the file's content in front of the updated code segment as below:

```
...
public class Hello {
    int x = 0;
    //Update at April 30, 2006 - By Ling
    int a = 1;
    public void printHello( ) {
        System.out.println("Hello world");
    }
    public void printBye( ) {
        System.out.println("Bye");
    }
}
...
```

Then the source file is modified by those policies in the policy set with the right type. In this case, the "Smart merging policy" is not applicable for Ling's check-in action as there is no conflict for his check-in action. The "Code formatting policy", "Copyright information validation policy" and "Public API protection policy" will also be taken action. In this situation, the source file will not be changed.

Later, "Sam" completes his update and checks-in the file also with the "Information update tagging policy" selected as below:

```
...
public class Hello {
    int x = 0;
    //Update at May 1, 2006 - By Sam
    int b = 2;
    public void printHello( ) {
        System.out.println("Hello world");
    }
    public void printBye( ) {
        System.out.println("Bye");
    }
}
...
```

Then the source file is modified by those policies in the policy set with the right type. In this case, the "Smart merging policy" is applicable for Sam's check-in action as there is a potential conflict between Sam and Ling's actions. After a simple judge, the system thinks Sam and Ling's actions do not conflict with each other, so a smart merging is taken automatically as below:

```
...
public class Hello {
    int x = 0;
    //Update at April 30, 2006 - By Ling
    int a = 1;
    //Update at May 1, 2006 - By Sam
    int b = 2;
    public void printHello( ) {
        System.out.println("Hello world");
    }
    public void printBye( ) {
        System.out.println("Bye");
    }
}
...
```

The "Code formatting policy", "Copyright information validation policy" and "Public API protection policy" will also be taken action. In this situation, the source file will not be changed.

After that, the developer "Ling" checks out the source file again and he checks in the source file without selecting any policies. He changed one public API name as following:

```
...
public void printHelloWorld( ) {
...
```

The policy performing modules in the policy layer will be taken action. In this case, the "Public API protection policy" will determine that the public API has been changed, so this time the checking in operation fails. "Ling" will get an error message and the source file will not be changed.

After that, another developer "Tom" wants to view the main content of the file "Hello.java". He opens the file with the "Document summary generating policy", and only main parts of the file are included and given to him. The main content may be as following:

```
public class Hello {
    public void printHello( );
    public void printBye( );
}
```

Phase IV: Build for different platform. Integrator retrieves related files for different builds. In most situations, different builds for different platforms are needed. So the integrator chooses the "Export for different platform policy" and selects "DOS" and "UNIX" as user preference. That means those source files will be exported to local with two copies: one with "DOS" format files and the other with "UNIX" format files.

From the above description it can be seen that the version control method of the embodiment can customize different policies for different projects or users in a version control system, and do corresponding customization during development of different source files and projects, thereby significantly improves the flexibility of the version control system.

Additionally, it should be noted that the method of setting customized policy for version control and the version control method of the invention is not only applicable to the above described program development environment, but also is applicable to other environments where version control is needed, for example, document management system, office automation system etc., the principle of which is the same as that of the above described program development and will not be repeated here.

Figure 5:
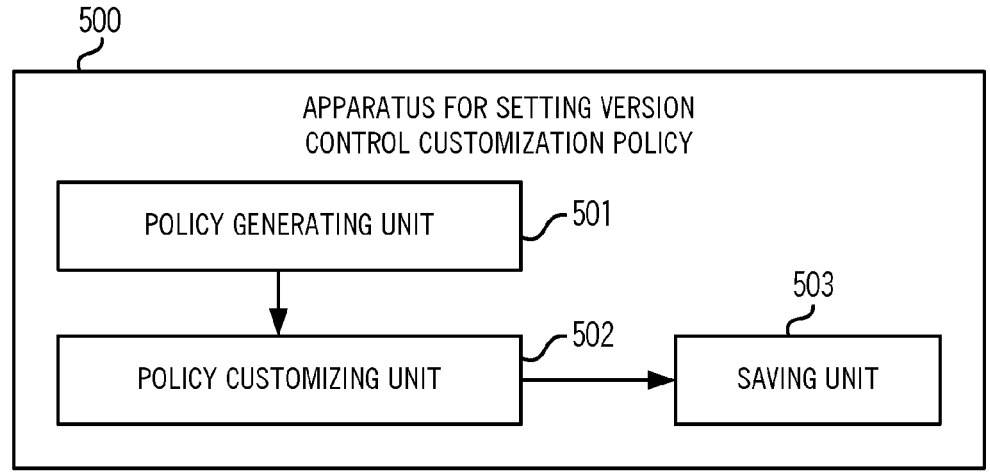
FIG. 5 is a block diagram of an apparatus of setting customized policy for version control according to another embodiment of the invention.

Under the same inventive conception, FIG. 5 is a block diagram of an apparatus of setting customized policy for version control according to another embodiment of the invention. Next, the embodiment will be described in conjunction with FIG. 5. For those same part as the above embodiment, the description of which will be properly omitted.

As shown in FIG. 5, apparatus 500 for setting customized policy for version control of the present embodiment comprises: a policy generating unit 501 for generating one or more version control customized policies by selecting or setting a version control option; a policy customizing unit 502 for associating the version control customized policy generated by said policy generating unit 501 with one project or user; and a saving unit 503 for saving said version control customized policy and information of its associated project or user.

Specifically, the version control repository is the same as that of the embodiment described above with reference to FIG. 1, and it will not be described here for brevity. The version control option includes, but not limited to: Code Formatting policy, Document Summary Generating policy, Copyright information validation policy, Metadata Replacement policy, Public API Protection policy, Adding Header to New Added Source File policy, Smart Merging policy, Information Update Tagging policy, Exporting for Different Platform policy, Setting Version for Specific User policy, Confliction Notifying policy and combination thereof. It should be understood that the invention is not limited to this, therefore, the version control repository of the invention can comprises any existing and future developed version control option known to those skilled in the art.

The policy customizing unit 502 can customize project mandatory policies for different projects and can customize user customized policies for different users. Thus, through customization, the version control customized policy generated by policy generating unit 501 is associated with one project or user.

The saving unit 503 saves said version control customized policy and information of its associated project or user in a customizable layer, the customizable layer is the same as that of the embodiment described above, and it will not be described here for brevity.

From the above description it can be seen that the apparatus of setting customized policy for version control of the embodiment can customize different policies for different projects or users, and do corresponding customization during development of different source files and projects, thereby significantly improves the flexibility of the version control system.

Figure 6:
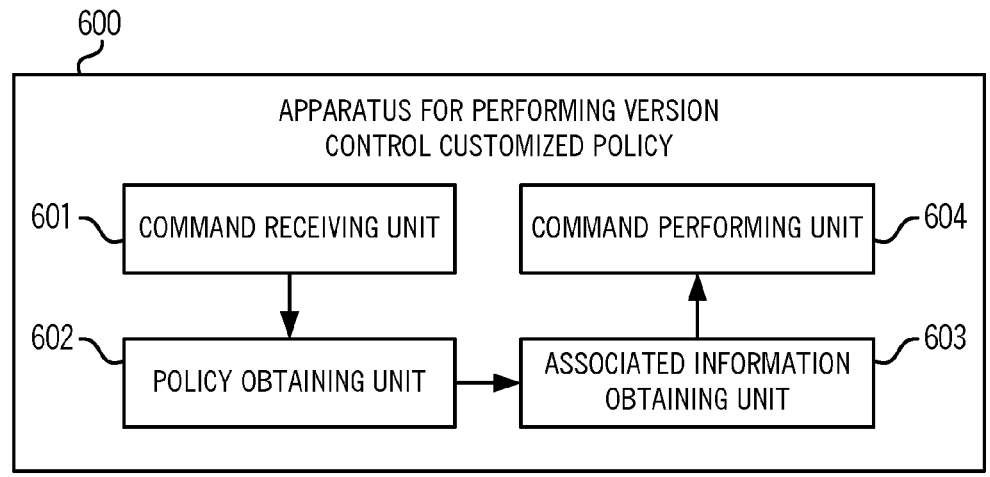
FIG. 6 is a block diagram of an apparatus for performing version control customized policy according to another embodiment of the invention.

Under the same inventive conception, FIG. 6 is a block diagram of an apparatus for performing version control customized policy according to another embodiment of the invention. Next, the embodiment will be described in conjunction with FIG. 6. The description will be properly omitted for those same parts as the above embodiment.

As shown in FIG. 6, apparatus for performing version control customized policy of the embodiment comprises: a command receiving unit 601 for receiving a version control command; a policy obtaining unit 602 for obtaining one or more version control customized policies associated with the version control command received by the command receiving unit 601, wherein each of said version control customized policy contains a pre-selected or pre-set version control option; an associated information obtaining unit 603 for obtaining information of an associated project or user; and a command performing unit 604 for performing said version control command customly according to one or more version control customized policies obtained by the policy obtaining unit 602 and information of the associated project or user obtained by the associated information obtaining unit 603.

Specifically, the command received by the command receiving unit 601 comprises: add files into a version control system, update files in the version control system, or retrieve files from the version control system. In particular, the command contains add to source control, check-in, check-out, export and any other command that is known to those skilled in the art, the invention has no limitation to this.

The example of the pre-selected or pre-set version control option contained in each of said version control customized policies obtained by the policy obtaining unit 602 includes, but not limited to: Code Formatting policy, Document Summary Generating policy, Copyright information validation policy, Metadata Replacement policy, Public API Protection policy, Adding Header to New Added Source File policy, Smart Merging policy, Information Update Tagging policy, Exporting for Different Platform policy, Setting Version for Specific User policy, Confliction Notifying policy, etc. It should be understood that the optional version control customized policy is not limited to this, it can be a combination of the foregoing version control customized policies, or it can comprise any existing and future developed version control customized policies known to those skilled in the art.

The information of the associated project or user obtained by the associated information obtaining unit 603 can be contained in version control customized policy, or it is also possible that the version control customized policies do not have any information of the associated project or user, instead, the received version control command contains information of the associated project or user, in this case, the information is associated with the version control customized policy. These version control customized policies and information of the project or user associated with each version control customized policy can be saved in the customizable policy layer of the version control system. Here, obtaining version control customized policies associated with said version control command can be implemented in various ways, such as the version control customized policy is customized when executing the version control command; one or more stored version control customized policies can be associated with the version control command in advance, and the version control customized policy is retrieved when executing the version control command; or the version control customized policy can be customized first, but it is not associated with the version control command, and association is performed when executing the version control command, etc.

The command performing unit 604 locates in the customizable policy layer, and performs the version control command customly according to the selected version control customized policies. The detailed performing process is the same as that of the embodiment described above with reference to FIG. 3, and will not be described here for brevity.

From the above description it can be seen that the apparatus 600 for performing version control customized policy of the embodiment can customize different policies for different projects or users, and do corresponding customization during development of different source files and projects, thereby significantly improves the flexibility of the version control system.

Figure 7:
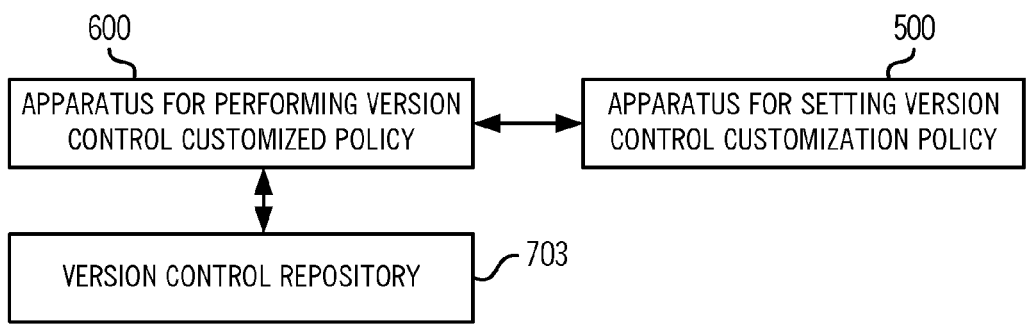
FIG. 7 is a block diagram of a version control system according to another embodiment of the invention.

Under the same inventive conception, FIG. 7 is a block diagram of a version control system according to another embodiment of the invention. Next, the embodiment will be described in conjunction with FIG. 7. The description will be omitted for those same parts as the above embodiment.

As shown in FIG. 7, the version control system of the embodiment comprises: the apparatus 500 for setting version control customized policy; a version control repository 703; and the apparatus 600 for performing version control customized policy.

From the above description it can be seen that the version control system of the embodiment can customize different policies for different projects or users, and do corresponding customization during development of different source files and projects, thereby significantly improves the flexibility of the version control system.

Although a method of setting customized policy for version control, a version control method, an apparatus of setting customized policy for version control, an apparatus for performing version control customized policy and a version control system of the present invention has been described in detail through exemplary embodiments, these embodiments are not exhaustive. Therefore, the present invention is not limited to these embodiments, and the scope of the invention is defined only by the accompanying claims.

What is claimed is:

1. A method of setting customized policy for version control, comprising the steps of:
generating, in response to detecting a user selection of a version control option, at least one executable version control customized policy entity that provides source code file processing capabilities according to the detected selection of the version control option;
associating the generated at least one executable version control customized policy entity with a project or user to create one of a project-customized and a user-customized version control policy association, respectively, where the at least one executable version control customized policy entity is executed as source code files are processed in association with the respective project or user; and
saving the generated at least one executable version control customized policy entity and information of the associated project or user.

2. The method of claim 1, where the generated at least one executable version control customized policy entity comprises at least one item selected from a group consisting of a generated project-customized and user-customized: Code Formatting policy, Document Summary Generating policy, Copyright information validation policy, Metadata Replacement policy, Public API Protection policy, Adding Header to New Added Source File policy, Smart Merging policy, Information Update Tagging policy, Exporting for Different Platform policy, Setting Version for Specific User policy, Confliction Notifying policy, and a combination thereof.

3. The method of claim 1, further comprising repeating the steps of generating, associating, and saving in response to detecting an additional selection of at least one additional version control option.

4. The method of claim 3, further comprising associating a plurality of generated executable version control customized policy entities with the project, where each of the plurality of generated executable version control customized policy entities is executed as the source code files are processed in association with the project.

5. The method of claim 3, further comprising associating a plurality of generated executable version control customized policy entities with the user, where each of the plurality of generated executable version control customized policy entities is executed as the source code files are processed in association with the user.

6. The method of claim 1, where associating the generated at least one executable version control customized policy entity with the project comprises associating each user related to the project with the generated at least one executable version control customized policy entity associated with that project.

7. The method of claim 1, where saving the generated at least one executable version control customized policy entity and the information of the associated project or user comprises saving the generated at least one executable version control customized policy entity and the information of the associated project or user in a customizable policy layer, where the generated at least one executable version control customized policy entity is executed within the customizable policy layer as the source code files are processed in association with the project or the user.

8. A version control method, comprising the steps of:
receiving a version control command that identifies a selection by a user of at least one executable version control customized policy entity, where the at least one executable version control customized policy entity comprises executable code that provides one of project-customized and user-customized version control file processing capabilities for source code files;
obtaining the at least one executable version control customized policy entity identified by the version control command;
obtaining information of an associated project or user; and
executing the at least one executable version control customized policy entity to process at least one source code file associated with the respective project or user according to the one of the project-customized and the user-customized version control file processing capabilities provided by the at least one executable version control customized policy entity.

9. The method according to claim 8, where the obtained at least one executable version control customized policy entity comprises at least one item selected from a group consisting of a generated project-customized and user-customized: Code Formatting policy, Document Summary Generating policy, Copyright information validation policy, Metadata Replacement policy, Public API Protection policy, Adding Header to New Added Source File policy, Smart Merging policy, Information Update Tagging policy, Exporting for Different Platform policy, Setting Version for Specific User policy, Confliction Notifying policy, and a combination thereof.

10. The method according to claim 8, where obtaining the at least one executable version control customized policy entity identified by the version control command comprises obtaining the at least one executable version control customized policy entity associated with a project aimed by the version control command.

11. The method according to claim 8, where obtaining the at least one executable version control customized policy entity identified by the version control command comprises obtaining at least one version control customized policy entity associated with the user.

12. The method according to claim 8, where each user related to the project is associated with the at least one executable version control customized policy entity associated with that project.

13. An apparatus for setting customized policy for version control, comprising:
- a memory; and
- a processor programmed to execute:
  - a policy generating unit configured to generate, in response to detecting a user selection of a version control option, at least one executable version control customized policy entity that provides source code file processing capabilities according to the detected selection of the version control option;
  - a policy customizing unit configured to associate the at least one executable version control customized policy entity generated by the policy generating unit with a project or user to create one of a project-customized and a user-customized version control policy association, respectively, where the at least one executable version control customized policy entity is executed as source code files are processed in association with the respective project or the user; and
  - a saving unit configured to save the generated at least one executable version control customized policy entity and information of the associated project or user within the memory.

14. The apparatus according to claim 13, where the generated at least one executable version control customized policy entity comprises at least one item selected from a group consisting of a generated project-customized and user-customized: Code Formatting policy, Document Summary Generating policy, Copyright information validation policy, Metadata Replacement policy, Public API Protection policy, Adding Header to New Added Source File policy, Smart Merging policy, Information Update Tagging policy, Exporting for Different Platform policy, Setting Version for Specific User policy, Confliction Notifying policy, and a combination thereof.

15. The apparatus according to claim 13, where the policy generating unit generates a plurality of executable version control customized policy entities.

16. The apparatus according to claim 15, where the policy customizing unit associates the project with the plurality of generated executable version control customized policy entities, where each of the plurality of generated executable version control customized policy entities is executed as the source code files are processed in association with the project.

17. The apparatus according to claim 15, where the policy customizing unit associates the user with the plurality of generated executable version control customized policy entities, where each of the plurality of generated executable version control customized policy entities is executed as the source code files are processed in association with the user.

18. The apparatus according to claim 13, where the policy customizing unit associates each user related to the project with the generated at least one executable version control customized policy entity associated with that project.

19. The apparatus according to claim 13, where the saving unit saves the generated at least one executable version control customized policy entity and the information of the associated project or user within the memory in a customizable policy layer, where the generated at least one executable version control customized policy entity is executed within the customizable policy layer as the source code files are processed in association with the project or the user.

20. An apparatus for performing version control customized policy, comprising:
- a command receiving unit configured to receive a version control command that identifies a selection by a user of at least one executable version control customized policy entity, where the at least one executable version control customized policy entity comprises executable code that provides one of project-customized and user-customized version control file processing capabilities for source code files; and
- a processor programmed to execute:
  - a policy obtaining unit configured to obtain the at least one executable version control customized policy entity identified by the version control command;
  - an associated information obtaining unit configured to obtain information of an associated project or user; and
  - a command performing unit configured to execute the at least one executable version control customized policy entity obtained by the policy obtaining unit to process at least one source code file associated with the respective project or user according to the one of the project-customized and the user-customized version control file processing capabilities provided by the at least one executable version control customized policy entity.

* * * * *